(12) United States Patent
Kamazuka et al.

(10) Patent No.: US 12,229,420 B2
(45) Date of Patent: Feb. 18, 2025

(54) COMPRESSION-EXPANSION CONTROL APPARATUS, STORAGE SYSTEM, AND COMPRESSION-EXPANSION CONTROL METHOD

(71) Applicant: Hitachi, Ltd., Tokyo (JP)

(72) Inventors: Tomoyuki Kamazuka, Tokyo (JP); Yuusaku Kiyota, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 28 days.

(21) Appl. No.: 18/119,790

(22) Filed: Mar. 9, 2023

(65) Prior Publication Data

US 2024/0184460 A1 Jun. 6, 2024

(30) Foreign Application Priority Data

Dec. 6, 2022 (JP) .................................. 2022-194740

(51) Int. Cl.
*G06F 12/00* (2006.01)
*G06F 3/06* (2006.01)

(52) U.S. Cl.
CPC .......... *G06F 3/0626* (2013.01); *G06F 3/0629* (2013.01); *G06F 3/0673* (2013.01)

(58) Field of Classification Search
USPC ....................................................... 711/171
See application file for complete search history.

(56) References Cited

U.S. PATENT DOCUMENTS

| 2018/0107511 A1 | 4/2018 | Katayama |
| 2021/0176470 A1* | 6/2021 | Nishiyama ........... H04N 23/667 |
| 2022/0170660 A1* | 6/2022 | Folts ........................ F24F 11/83 |

FOREIGN PATENT DOCUMENTS

JP 2018-063576 A 4/2018

* cited by examiner

*Primary Examiner* — Mohamed M Gebril
(74) *Attorney, Agent, or Firm* — Procopio, Cory, Hargreaves & Savitch LLP

(57) ABSTRACT

A compression-expansion control apparatus has a reconfiguration portion capable of configuring one or more compression circuits which compress data in plain text and/or one or more expansion circuits which expand the compressed data on a programmable logical circuit component, a waiting-time observing portion which observes processing waiting-time from when compression processing was requested till when the compression processing is started and processing waiting-time from when expansion processing was requested till when the expansion processing is started, a calculating portion which determines the number or a ratio of the compression circuits and the expansion circuits in the reconfiguration portion on the basis of the processing waiting-time of the compression processing and the processing waiting-time of the expansion processing, and a switching portion which executes reconfiguration of the compression circuit and/or the expansion circuit in the reconfiguration portion on the basis of the number or the ratio determined by the calculating portion.

9 Claims, 7 Drawing Sheets

Compression-algorithm management table ~35

| Compression or expansion circuit # | Compression algorithm |
|---|---|
| 1 | Algorithm A |
| 2 | Algorithm B |
| 3 | Algorithm C |
| . . . . | . . . . |

FIG. 5

Configuration-setting management table ~36

| Configuration No | Compression circuit | Expansion circuit |
|---|---|---|
| 1 | 1 | N-1 |
| 2 | 2 | N-2 |
| . . . . | . . . . | . . . . |
| N-1 | N-1 | 1 |

FIG. 6

Reconfiguration-cycle management table ~37

| Reconfiguration cycle No | Cycle |
|---|---|
| 1 | T1 |
| 2 | T2 |
| . . . . | . . . . |
| T | TT |

FIG. 7

Circuit-state management table ~38

| Measurement time | Compression waiting-time | Expansion waiting-time | amount of data compressed | amount of data expanded | Selection configuration (calculation result) |
|---|---|---|---|---|---|
| Time 1 | TC1 | TD1 | AC1 | AD1 | 3 |
| Time 2 | TC2 | TD2 | AC2 | AD2 | 5 |
| Time 3 | TC3 | TD3 | AC3 | AD3 | 7 |
| . . . . | . . . . | . . . . | . . . . | . . . . | . . . . |

FIG. 8

Circuit-change granularity management table (optional) ~39

| Change granularity No | Circuit-change granularity |
|---|---|
| 1 | 1 |
| 2 | 2 |
| . . . . | . . . . |
| N | N |

FIG. 9

COMPRESSION-EXPANSION CONTROL APPARATUS, STORAGE SYSTEM, AND COMPRESSION-EXPANSION CONTROL METHOD

CROSS-REFERENCE TO RELATED APPLICATIONS

This application is based upon and claims the benefit of priority from Japanese Patent Application No. 2022-194740 filed in Japan Patent Office on Dec. 6, 2022, the contents of which are hereby incorporated by reference.

BACKGROUND

This disclosure relates to an art of executing compression and expansion of data.

In a storage system which can compress and store data, a compression-expansion circuit is mounted for speeding-up data compression and expansion in some cases. In the compression-expansion circuit, a compression circuit for compressing data and an expansion circuit for expanding data are mounted. In the compression-expansion circuit, when compression of data is requested, a compression circuit is allocated, and the data is compressed, and when expansion of data is requested, an expansion circuit is allocated, and the data is expanded. In the storage system, the data compression is performed with processing of storing data in an external storage apparatus, and the data expansion is performed with processing of taking out data from the external storage apparatus.

Here, the request for storage of data and the request for taking-out of data to the storage system are not generated at the same ratio all the time. For example, depending on a type of business, some business has a high frequency of processing of storing data in the external storage apparatus and some business has a high frequency of processing of taking out data from the external storage apparatus. Thus, there can be such a state that either one of the compression circuit and the expansion circuit runs short, while the other excesses.

In Japanese Patent Application Publication No. 2018-63576, in an information processing apparatus having a reconfiguration device capable of changing a configuration of a logical circuit by reconfiguration of dynamic parts, an information processing apparatus which can improve processing performance by appropriately performing circuit allocation of the reconfiguration devices for tasks to be executed is disclosed.

The information processing apparatus in Japanese Patent Application Publication No. 2018-63576 has a reconfiguration device which can change the circuit configuration by reconfiguration of the dynamic parts and a control portion which controls circuit disposition in the reconfiguration device. When the control portion disposes a processing circuit according to a new task in the reconfiguration device, it determines circuit allocation of a processing circuit according to an existing task and a processing circuit according to a new task with respect to an area combining an area used by the processing circuit according to the existing task being executed and a blank area on the basis of expected end time of processing of each task and disposes the processing circuit according to each task to the reconfiguration device in accordance with the determined circuit allocation.

SUMMARY

As described above, the information processing apparatus in Japanese Patent Application Publication No. 2018-63576 predicts end time of the task processing after receiving a command according to the new task and configures the circuit on the basis of the prediction result and thus, time required from reception of the command to the end of the processing becomes long, and when many commands with a small data amount are to be processed, it is considered that performances of the task processing by the compression-expansion circuit cannot be sufficiently exerted.

An object included in this disclosure is to provide an art which enables exertion of favorable performances in compression and expansion by the compression-expansion circuit which executes compression and expansion of data.

A compression-expansion control apparatus according to an aspect included in this disclosure is a compression-expansion control apparatus which compresses data in plain text and expands the compressed data and has a reconfiguration portion capable of configuring one or more compression circuits which compress data in plain text and/or one or more expansion circuits which expand the compressed data on a programmable logical-circuit component, a waiting-time observing portion which observes processing waiting-time from when compression processing was requested till when the compression processing is started and processing waiting-time from when expansion processing was requested till when the expansion processing is started, a calculating portion which determines the number or a ratio of the compression circuits and the expansion circuits in the reconfiguration portion on the basis of the processing waiting-time of the compression processing and the processing waiting-time of the expansion processing, and a switching portion which executes reconfiguration of the compression circuit and/or the expansion circuit in the reconfiguration portion on the basis of the number or the ratio determined by the calculating portion.

According to one aspect included in this disclosure, favorable performance can be exerted in compression and expansion in the compression-expansion circuit which executes compression and expansion of data.

BRIEF DESCRIPTION OF THE DRAWINGS

FIG. 5 is a diagram illustrating an example of a compression-algorithm management table according to the first embodiment;

FIG. 6 is a diagram illustrating an example of a configuration-setting management table according to the first embodiment;

FIG. 7 is a diagram illustrating an example of a reconfiguration-cycle management table according to the first embodiment;

FIG. 8 is a diagram illustrating an example of a circuit-state management table according to the first embodiment;

FIG. 9 is a diagram illustrating an example of a management-change granularity management table according to a variation of the first embodiment.

DETAILED DESCRIPTION OF THE EMBODIMENT

Hereinafter, embodiments of the present invention will be explained by referring to drawings.

First Embodiment

Figure 1:
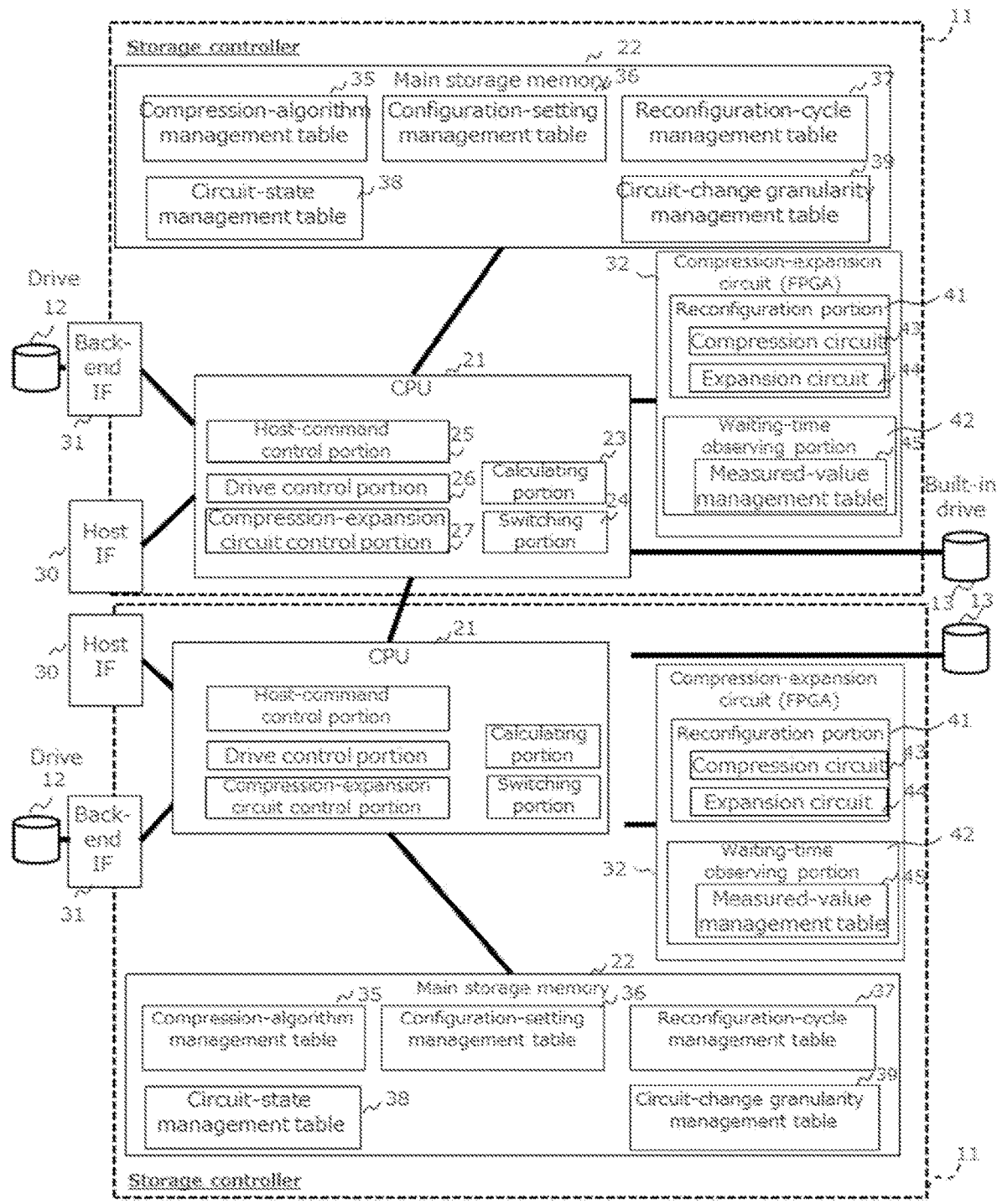
FIG. 1 is a block diagram of a storage system according to a first embodiment.

FIG. 1 is a block diagram of a storage system according to a first embodiment.

The Storage system 10 is a computer system configured by including a server and an external storage apparatus as an example and controlling storage and operation of data. The storage system 10 can compress data in plain text, store it, and expand and output the compressed data in storage. The storage system 10 can be configured number-changeably by a circuit for compressing the data in plain text and a circuit for expanding the compressed data on a programmable logical-circuit component.

The storage system 10 includes a storage controller 11, a drive 12, and a built-in drive 13. In FIG. 1, an example in which the storage controller 11, the drive 12, and the built-in drive 13 are doubled is illustrated.

The storage controller 11 is configured by a server, as an example, and controls storage of data in the external storage apparatus, taking-out of the data from the external storage apparatus and the like. The built-in drive 13 is an external storage apparatus disposed in the server and is an HDD (Hard Disk Drive), an SSD (Solid State Drive), a flash memory and the like, for example. The drive 12 is an external storage apparatus coupled to the server and is an HDD, an SSD, a flash memory and the like, for example. The drive 12 corresponding to each of various protocols is provided.

The storage controller 11 has a CPU 21, a main storage memory 22, a host interface 30, a back-end interface 31, and a compression-expansion circuit 32. The CPU 21 is a processing apparatus which realizes various functions of the storage controller 11 by executing processing of a software program by using the main storage memory 22. The CPU is an abbreviation of Central Processing Unit. The host interface 30 is an interface portion which relays transmission/reception of data with a host computer (hereinafter, also referred to as a "host"), not shown, used by a user. The back-end interface 31 is an interface portion which relays transmission/reception of data with the drive 12. The compression-expansion circuit 32 is an apparatus which performs compression and expansion of data when the compressed data is to be stored in the drive 12 or the built-in drive 13.

When the CPU 21 executes the software program, a calculating portion 23, a switching portion 24, a host-command control portion 25, a drive control portion 26, and a compression-expansion circuit control portion 27 are realized. In the main storage memory 22, a compression-algorithm management table 35, a configuration-setting management table 36, a reconfiguration-cycle management table 37, a circuit-state management table 38, and a circuit-change granularity management table 39 are configured.

The host-command control portion 25 processes a command from the host. The drive control portion 26 gives a command to each of the drives 12 and controls the drive 12. The compression-expansion circuit control portion 27 gives a command to the compression-expansion circuit 32 and controls the compression-expansion circuit 32.

The compression-expansion circuit 32 is configured by including an FPGA (Field Programmable Gate Array), which is a programmable logical circuit component and has a reconfiguration portion 41 and a waiting-time observing portion 42. The reconfiguration portion 41 can configure one or more compression circuits 43 which compress data in plain text and/or one or more expansion circuits 44 which expand the compressed data, capable of changing the numbers of the both on the programmable logical-circuit component. The waiting-time observing portion 42 observes, in the reconfiguration portion 41, processing waiting time from when processing of the compression circuit 43 was requested till when the processing is started and processing waiting time from when processing of the expansion circuit 44 was requested till when the processing is started.

When the FPGA logical circuit is to be reconfigured so that the numbers of the compression circuits 43 and the expansion circuits 44 in the reconfiguration portion 41 are changed, the calculating portion 23 determines the numbers or a ratio of the compression circuits 43 and the expansion circuits 44 on the basis of the processing waiting time of the compression circuit 43 and the processing waiting time of the expansion circuit 44. The switching portion 24 reconfigures the compression circuit 43 and/or the expansion circuit 44 in the reconfiguration portion 41 on the basis of the numbers or the ratio determined by the calculating portion 23. Specifically, the compression circuits 43 are decreased and the expansion circuits 44 are increased, or the expansion circuits 44 are decreased and the compression circuits 43 are increased.

Various tables configured in the main storage memory 22 and the compression-expansion circuit 32 and detailed operations of each portion on the CPU 21 and the compression-expansion circuit 32 using them will be described later.

Figure 2:
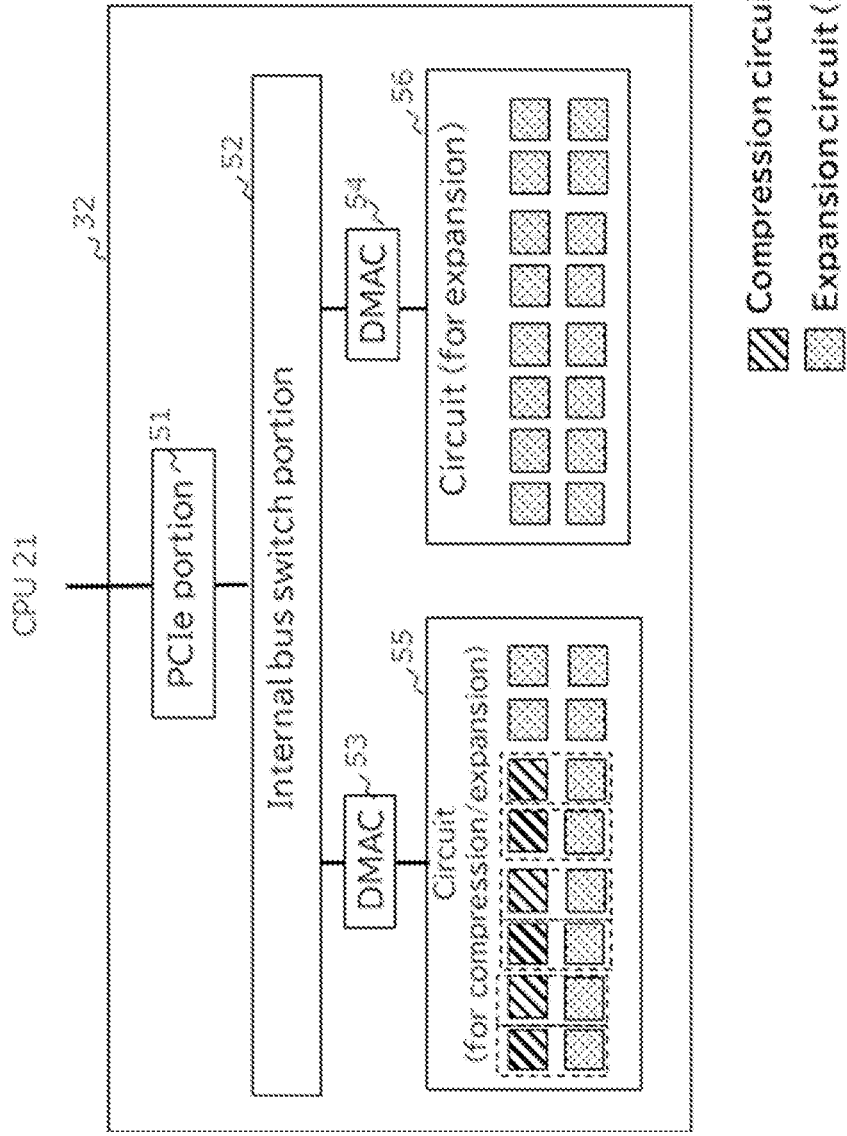
FIG. 2 is a diagram illustrating a state in which a compression circuit and an expansion circuit are configured in a compression-expansion circuit according to the first embodiment.

FIG. 2 is a diagram illustrating a state in which the compression circuit and the expansion circuit are configured in the compression-expansion circuit according to the first embodiment.

The compression-expansion circuit 32 is coupled to the CPU 21 by a PCIe portion 51, and an internal bus switch portion 52 is coupled to the PCIe portion 51. DMACs 53, 54 are coupled to the internal bus switch portion 52. A circuit 55 is coupled to the DMAC 53, and the circuit 56 is coupled to the DMAC 54. The circuit 55 is a circuit for compression/expansion in which the compression circuit 43 and the expansion circuit 44 are configured. The circuit 56 is a circuit for expansion in which only the expansion circuit 44 is configured. In the state exemplified in FIG. 2, the circuit 55 is a circuit for compression/expansion including the compression circuit 43 and the expansion circuit 44, and the circuit 56 is a circuit for expansion including only the expansion circuit 44, but the disposition of the compression circuit 43 and the expansion circuit 44 is changeable by reconfiguring the logical circuit of the FPGA.

The PCIe portion 51 performs transmission/reception of data and commands with the CPU 21. The internal bus switch portion 52 distributes and aggregates the data transmitted/received between the compression-expansion circuit 32 and the CPU 21.

The DMACs 53, 54 are DMA (Direct Memory Access) controllers which execute commands accompanied by compression and expansion of data by using the compression circuit 43 and/or the expansion circuit 44 on the circuits 55, 56.

Regarding the circuits 55, 56, the logical circuit configuration is changeable by the FPGA. As an example, it may be so configured that the circuits 55, 56 include a plurality of unit logical-circuit portions capable of configuring either one of the compression circuit 43 and the expansion circuit 44, and the compression circuit 43 and the expansion circuit 44 are configured in the number specified to the plurality of unit logical-circuit portions. In the example shown in FIG. 2, the circuit 55 and the circuit 56 include 16 units of the unit logical-circuit portions, respectively. In the circuit 55, 6 units of the compression circuits 43 and 10 units of the expansion circuits 44 are configured by using the 16 units of the unit logical-circuit portions. In the circuit 56, 16 units of the expansion circuits 44 are configured by using the 16 units of the unit logical-circuit portions.

In this embodiment, as an example, when the input plain-text data is to be compressed in the reconfiguration portion 41, with the compression circuit 43 and the expansion circuit 44 as a pair as surrounded by a broken line in FIG. 2, the compression circuit 43 generates compressed data in which the plain-text data is compressed, the expansion circuit 44 restores the plain-text data in which the compressed data is expanded, and when an error detection code with respect to the input plain-text data matches an error detection code with respect to the restored plain-text data, the compressed data and an error detection code with respect to the input plain-text data or an error detection code with respect to the restored plain-text data are output. When the input compressed data is to be expanded in the reconfiguration portion 41, the expansion circuit 44 singularly generates expanded data in which the input compressed data is expanded, and when an error detection code accompanying the input compressed data matches an error detection code with respect to the expanded data, the expanded data is output. Therefore, when the compression circuits 43 are decreased and the expansion circuits 44 are increased, the switching portion 24 replaces the compression circuit 43 included in the pair with the expansion circuit 44 and changes the expansion circuit 44 included in the pair to the single expansion circuit 44.

Figure 3:
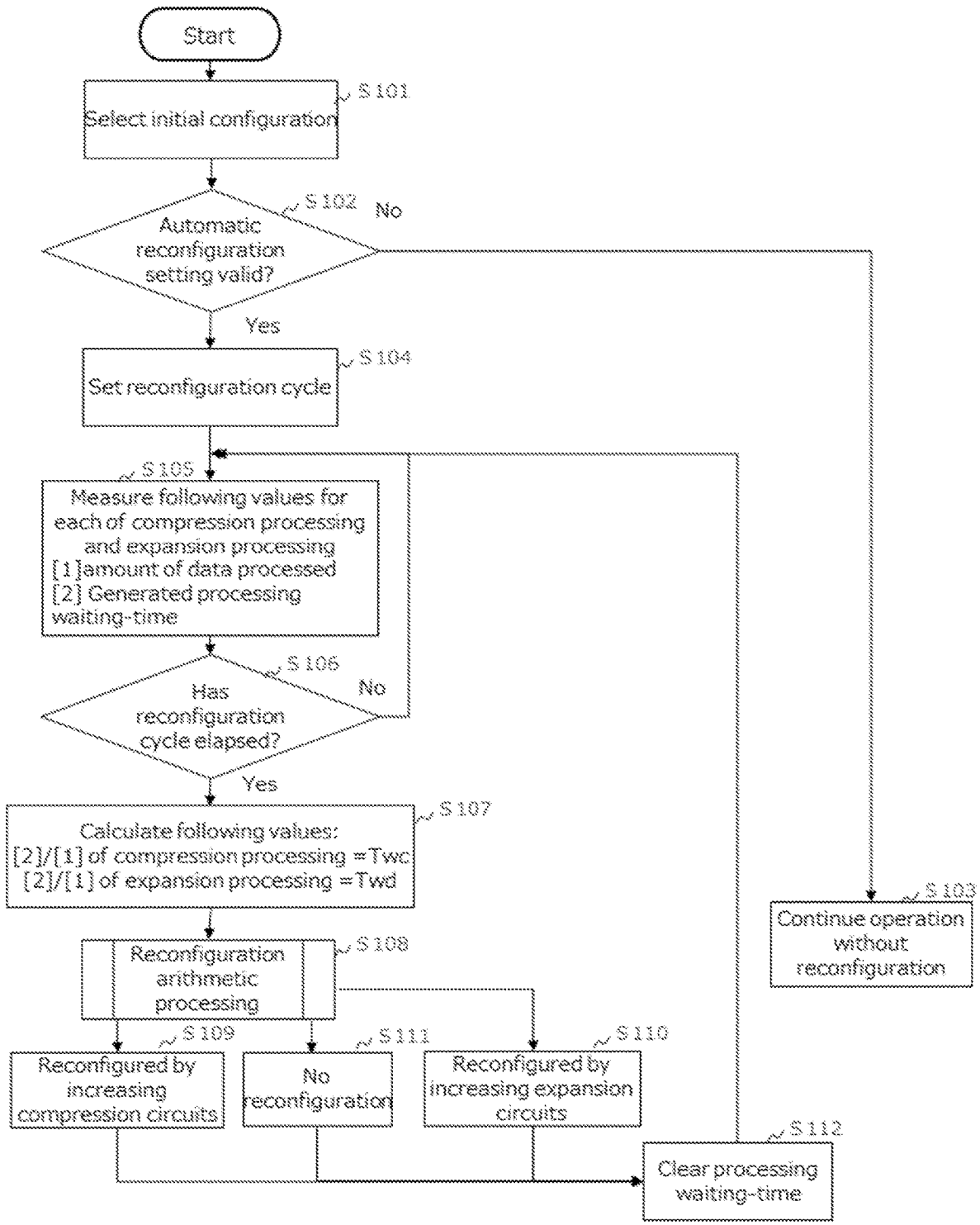
FIG. 3 is a flowchart of reconfiguration processing according to the first embodiment.
Figure 4:
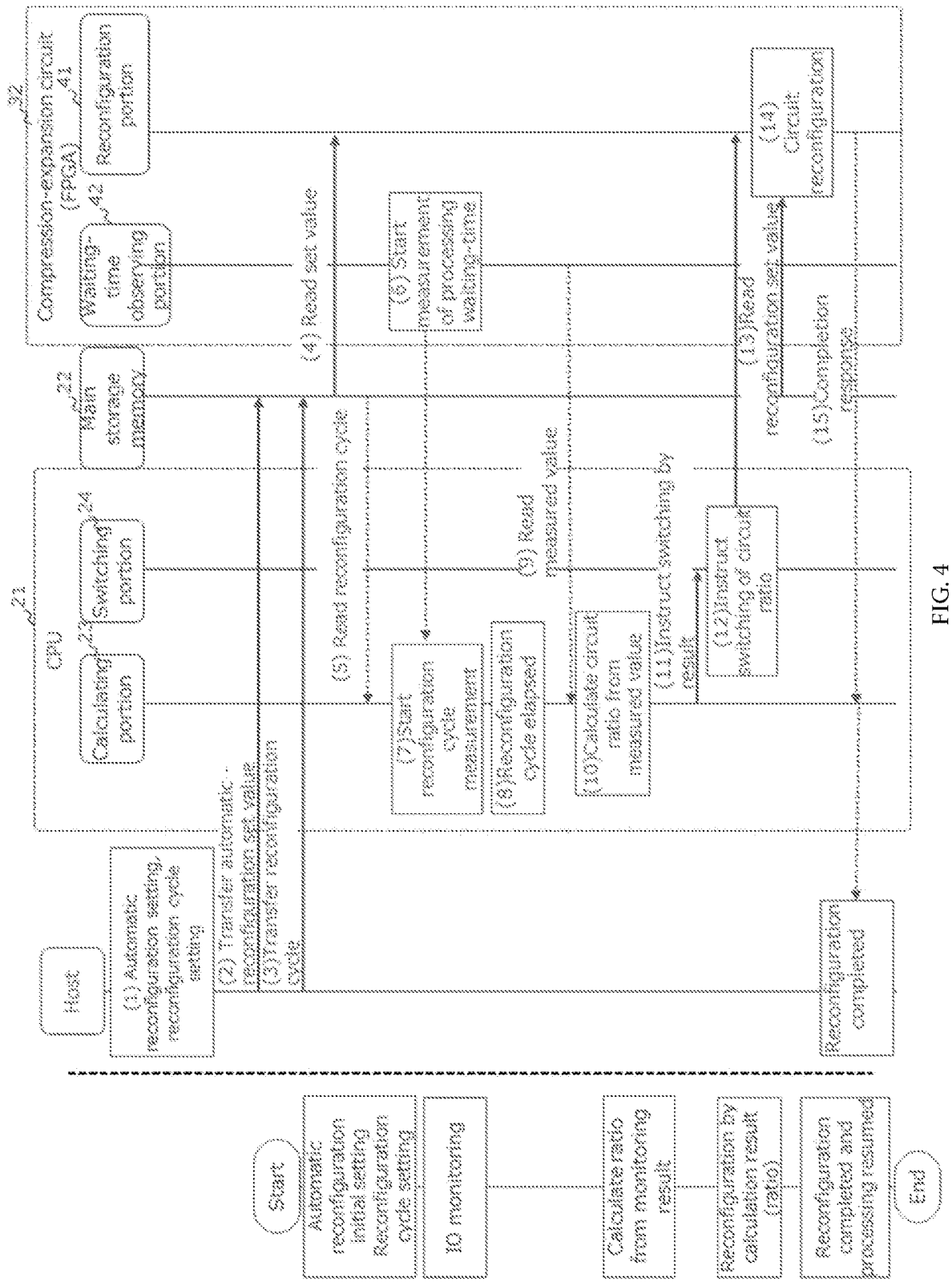
FIG. 4 is a sequence diagram between blocks in an example of the reconfiguration processing according to the first embodiment.

FIG. 3 is a flowchart of the reconfiguration processing according to the first embodiment. FIG. 4 is a sequence diagram between blocks in an example of the reconfiguration processing according to the first embodiment.

By referring to FIG. 3, at Step S101, the storage controller 11 configures the compression circuit 43 and the expansion circuit 44 in accordance with the number or the ratio determined in advance as an initial configuration and a compression algorithm. The number or the ratio of the compression circuits 43 and the expansion circuits 44 in the initial configuration and the compression algorithm used for the compression and expansion are not particularly limited.

FIG. 5 is a diagram illustrating an example of a compression-algorithm management table according to the first embodiment. In the compression-algorithm management table 35, compression algorithms associated with numbers (#) of the compression circuits or the expansion circuits are set. In the example in FIG. 5, an algorithm A is set to the number 1 circuit, an algorithm B is set to the number 2 circuit, and an algorithm C is set to the number 3 circuit, respectively.

For example, when the compression algorithm applied to the storage system 10 is to be updated to a new algorithm, such a method is employed that the compressed data stored in the external storage apparatus is not immediately re-compressed by the new compression algorithm but the compression algorithm is switched to the new compression algorithm when the data is read and re-written again in some cases. In that case, since the compression algorithm for the data stored in the external storage apparatus gradually becomes the new compression algorithm, a transitional state occurs for some time in which two types of the compression algorithms exist in the storage system 10. The storage controller 11 can realize the compression processing and the expansion processing in the transitional state by mixing the expansion circuits 44 with two compression algorithms in the compression-expansion circuit 32. By measuring processing waiting time of the expansion processing separately for each of the compression algorithms and by controlling the number or the ratio of the expansion circuits 44 for each of the compression algorithms on the basis of the processing waiting time of the expansion circuits 44 for each of the compression algorithms which were measured, the number or the ratio of the expansion circuits 44 can be favorably caused to transit in accordance with the ratio of processing required for each of the compression algorithms which are gradually changing.

It is not necessarily required to use a plurality of types of the compression algorithms but a certain compression algorithm may be used in common for all the circuits, for example. In that case, the same compression algorithm may be set to all the circuits in the compression-algorithm management table 35 or management of the compression algorithms by the compression-algorithm management table 35 does not have to be executed.

FIG. 6 is a diagram illustrating an example of a configuration-setting management table according to the first embodiment.

In the configuration-setting management table 36, the number of the compression circuits 43 and the number of the expansion circuits 44 are set in association with configuration numbers (configuration Nos). Here, the number of unit logical-circuit portions which can configure either one of the compression circuit 43 and the expansion circuit 44 is N. For example, the configuration number 1 indicates such a configuration that the number of the compression circuits 43 is 1, and the number of the expansion circuits 44 is N−1. The configuration number 2 indicates such a configuration that the number of the compression circuits 43 is 2, and the number of the expansion circuits 44 is N−2. The configuration number N−1 indicates such a configuration that the number of the compression circuits 43 is N−1, and the number of the expansion circuits 44 is 1. The aforementioned initial configuration and the configuration after the reconfiguration are specified by the configuration numbers in the configuration-setting management table 36.

At Step S102, the storage controller 11 determines whether setting of automatic reconfiguration is valid or not. In this embodiment, as an example, whether a function of the automatic reconfiguration which automatically updates the numbers of the compression circuits 43 and the expansion circuits 44 of the reconfiguration portion 41 should be valid or not can be set. If the automatic reconfiguration is not valid, at Step S103, the storage controller 11 does not execute reconfiguration but continues compression and expansion operations of the data still in the initial configuration.

On the other hand, if the automatic reconfiguration is valid, at Step S104, the storage controller 11 sets a reconfiguration cycle and starts measurement of elapsed time.

FIG. 7 is a diagram illustrating an example of a reconfiguration-cycle management table according to the first embodiment. In the reconfiguration-cycle management table 37, cycles for executing the reconfiguration processing are set in association with reconfiguration cycle numbers (reconfiguration cycle Nos). For example, the reconfiguration cycle number 1 indicates a cycle T1, and the reconfiguration cycle number 2 indicates a cycle T2. Values of the reconfiguration cycles used by the storage controller 11 are specified by the reconfiguration cycle numbers of the reconfiguration-cycle management table 37. For example, if the reconfiguration cycle number 1 is specified, the storage controller 11 sets the cycle T1.

In the example in FIG. 4, the setting of the automatic reconfiguration is valid. And in the host computer, (1) the setting of the automatic reconfiguration and the setting of the reconfiguration cycle are made, and (2, 3) set values of the automatic reconfiguration and the reconfiguration cycle are transferred to the main storage memory 22 of the storage controller 11 from the host computer. The set value of the automatic reconfiguration includes information specifying the initial configuration, and in the reconfiguration portion 41, (4) the set value of the automatic reconfiguration is read, and the compression circuit 43 and the expansion circuit 44 are configured in accordance with the initial configuration specified therein. Moreover, (5) the calculating portion 23 reads and sets the setting of the reconfiguration cycle. As a result, (6) the waiting-time observing portion 42 starts measurement of the processing waiting-time, and (7) the calculating portion 23 starts measurement of elapsed time.

By referring to FIG. 3, while the data compression and expansion operations are performed by the reconfiguration portion 41, the storage controller 11 measures, for each of the compression processing and the expansion processing, [1] an amount of data processed and [2] generated processing waiting-time. The amount of data processed in the compression processing is a data amount in plain-text data compressed by using a pair of the compression circuit 43 and the expansion circuit 44, for example. The amount of data processed in the expansion processing is a data amount in the plain-text data acquired by expansion using the expansion circuit 44, for example. The processing waiting-time in the compression processing is time for waiting until a usable pair is generated in the case of no usable pair of the compression circuit 43 and the expansion circuit 44 when data compression is requested. The processing waiting-time in the expansion processing is time for waiting until the usable expansion circuit 44 is generated in the case of no usable expansion circuit 44 when data expansion is requested. The storage controller 11 records and manages those integrated values in a measured-value management table 45.

At Step S105, the storage controller 11 acquires information of [1] the amount of data processed and [2] the generated processing waiting-time for each of the compression processing and the expansion processing from the measured-value management table 45.

At Step S106, the storage controller 11 determines whether the elapsed time from the measurement start at Step S104 has reached the reconfiguration cycle. If the elapsed time has not reached the reconfiguration cycle, the storage controller 11 returns to Step S105. If the elapsed time has reached the reconfiguration cycle, the storage controller 11 calculates the processing waiting-time per unit of data amount processed for each of the compression processing and the expansion processing at Step S107. It is assumed that the processing waiting-time per unit of data amount processed in the compression processing is Twc, and the processing waiting-time per unit of data amount processed in the expansion processing is Twd.

At Step S108, the storage controller 11 executes the reconfiguration arithmetic processing. The reconfiguration arithmetic processing is processing for determining the number or the ratio of the compression circuits 43 and the expansion circuits 44. As an example, in the reconfiguration arithmetic processing, the number or the ratio of the compression circuits 43 and the expansion circuits 44 is determined by a logic shown in (A) to (E).

(A) Twc=0 and Twd=0: The current numbers are maintained (B) Twc>0 and Twd=0: The compression circuits are increased only by (Twc/Tc) pieces (Tc is time required for processing the data in a predetermined unit data amount by one compression circuit 43)

(C) Twc=0 and Twd>0: The expansion circuits are increased only by (Twd/Td) pieces (Td is time required for processing the data in a predetermined unit data amount by one expansion circuit 44)

(D) Twc>0 and Twd>0 and Twc=Twd: The current numbers are maintained (E) Twc>0 and Twd>0 and Twc #Twd: The current numbers are maintained In the case of Twc>0 and Twd>0 and Twc #Twd, (E) in the aforementioned example is assumed to maintain the current numbers are maintained and the ratio between the waiting time of the compression processing and the waiting time of the expansion processing are maintained, but there can be a variation that (E) is replaced with (E1) and (E2) shown below. The variation is to level (uniformize) the processing waiting time of the compression processing and the expansion processing.

(E1) Twc>0 and Twd>0 and Twc> Twd: The compression circuits are increased only by (((Twc−Twd)/2)/Tc) pieces (E2) Twc>0 and Twd>0 and Twd> Twc: The expansion circuits are increased only by (((Twd−Twc)/2)/Td) pieces In FIG. 4, the calculating portion 23 (8) detects that the reconfiguration cycle has elapsed, (9) reads the measured value from the waiting-time observing portion 42, and (10) calculates the ratio between the compression circuits 43 and the expansion circuits 44 from the measured values by the reconfiguration arithmetic processing.

Returning to FIG. 3, as the result of the reconfiguration arithmetic processing, when the compression circuits are to be increased, at Step S109, the storage controller 11 decreases the expansion circuits 44 and increases the compression circuits 43 in accordance with the number or the ratio determined by the reconfiguration arithmetic processing. When the expansion circuits are to be increased, at Step S110, the storage controller 11 decreases the compression circuits 43 and increases the expansion circuits 44 in accordance with the number or the ratio determined by the reconfiguration arithmetic processing. Moreover, when the current numbers of the compression circuits 43 and the expansion circuits 44 are to be maintained, at Step S111, the reconfiguration portion 41 does not execute the reconfiguration.

After Steps S109, 110, 111, the storage controller 11 clears the integrated processing waiting-time, returns to Step S105 and repeats the processing.

FIG. 4 exemplifies a case where some reconfiguration is needed, (11) the calculating portion 23 instructs reconfiguration of switching the ratios of the circuits to the switching portion 24, and (12) the switching portion 24 instructs the reconfiguration to the reconfiguration portion 41. The instruction from the switching portion 24 to the reconfiguration portion 41 specifies the configuration number reflecting the result of the reconfiguration arithmetic processing, and the reconfiguration portion 41 (13) acquires information on the numbers of the compression circuits 43 and the expansion circuits 44 corresponding to the specified configuration numbers by referring to the configuration-setting management table 36 set in the main storage memory 22, and (14) executes reconfiguration in accordance with the information. When the reconfiguration is completed, the reconfiguration portion 41 makes a response notifying the host computer that the reconfiguration has been completed.

Each time the reconfiguration cycle elapses, the reconfiguration arithmetic processing is executed, and the reconfiguration is executed in accordance with the result. The result of the reconfiguration arithmetic processing is recorded in a time series in the circuit-state management table 38.

FIG. 8 is a diagram illustrating an example of the circuit-state management table according to the first embodiment.

In the circuit-state management table 38, compression waiting-time, expansion waiting-time, an amount of data compressed, and an amount of data expanded in association with the measurement time (time when the reconfiguration cycle has elapsed) and the configuration numbers selected as calculation results at that time are recorded. For example, when the measurement time is time 1, it is indicated that the compression waiting-time is TC1, the expansion waiting-time is TD1, the amount of data compressed is AC1, and the amount of data expanded is AD1, and the configuration number selected on the basis of them is 3.

As described above, according to this embodiment, since the numbers or the ratio of the compression circuits 43 and the expansion circuits 44 is controlled on the basis of the processing waiting-time of the compression circuit 43 and the processing waiting-time of the expansion circuit 44, favorable performances according to the required processing of compression and expansion can be exerted.

In this embodiment, the reconfiguration is configured to be executed so that the numbers of the compression circuits 43 and the expansion circuits 44 determined by the reconfiguration arithmetic processing are realized, but as an optional function, by setting granularity of a circuit change in the reconfiguration, the numbers of the compression circuits 43 and the expansion circuits 44 in the reconfiguration may be determined on the basis of the reconfiguration arithmetic processing and the granularity setting.

FIG. 9 is a diagram illustrating an example of the circuit-change granularity management table 39 according to a variation of the first embodiment. In the circuit-change granularity management table 39, the circuit-change granularity is set in association with a change granularity number (change granularity No). The circuit-change granularity is an upper-limit value of a decrease number of the compression circuits or the expansion circuits in one session of the reconfiguration.

The storage controller 11 determines the numbers or the ratio of the compression circuits 43 and the expansion circuits 44 such that, when the decrease number of the compression circuits 43 or the expansion circuits 44 calculated by the reconfiguration arithmetic processing is equal to or smaller than the circuit-change granularity, the storage controller 11 applies a decrease only by the decrease number, and when the decrease number is the circuit-change granularity or more, the storage controller 11 applies the decrease only by the number of the circuit-change granularity. For example, if the change-granularity number 1 is set, the storage controller 11 sets the number by which the compression circuits or the expansion circuits are decreased in one session of the reconfiguration to one.

Second Embodiment

In the first embodiment, the storage controller 11 compares, as the reconfiguration arithmetic processing, an index value obtained by dividing the processing waiting-time of the compression circuit 43 by a data amount compressed by the compression circuit 43 with an index value obtained by dividing the processing waiting-time of the expansion circuit 44 by the data amount expanded by the expansion circuit 44 and determines the numbers or the ratio of the compression circuits 43 and the expansion circuits 44 on the basis of a comparison result. However, other types of the reconfiguration arithmetic processing may be employed. In a second embodiment, an example in which the other types of the reconfiguration arithmetic processing are employed will be shown.

A configuration and an operation of the storage system 10 according to the second embodiment are basically similar to those of the first embodiment. However, a part of the second reconfiguration processing is different from that of the first embodiment.

Figure 10:
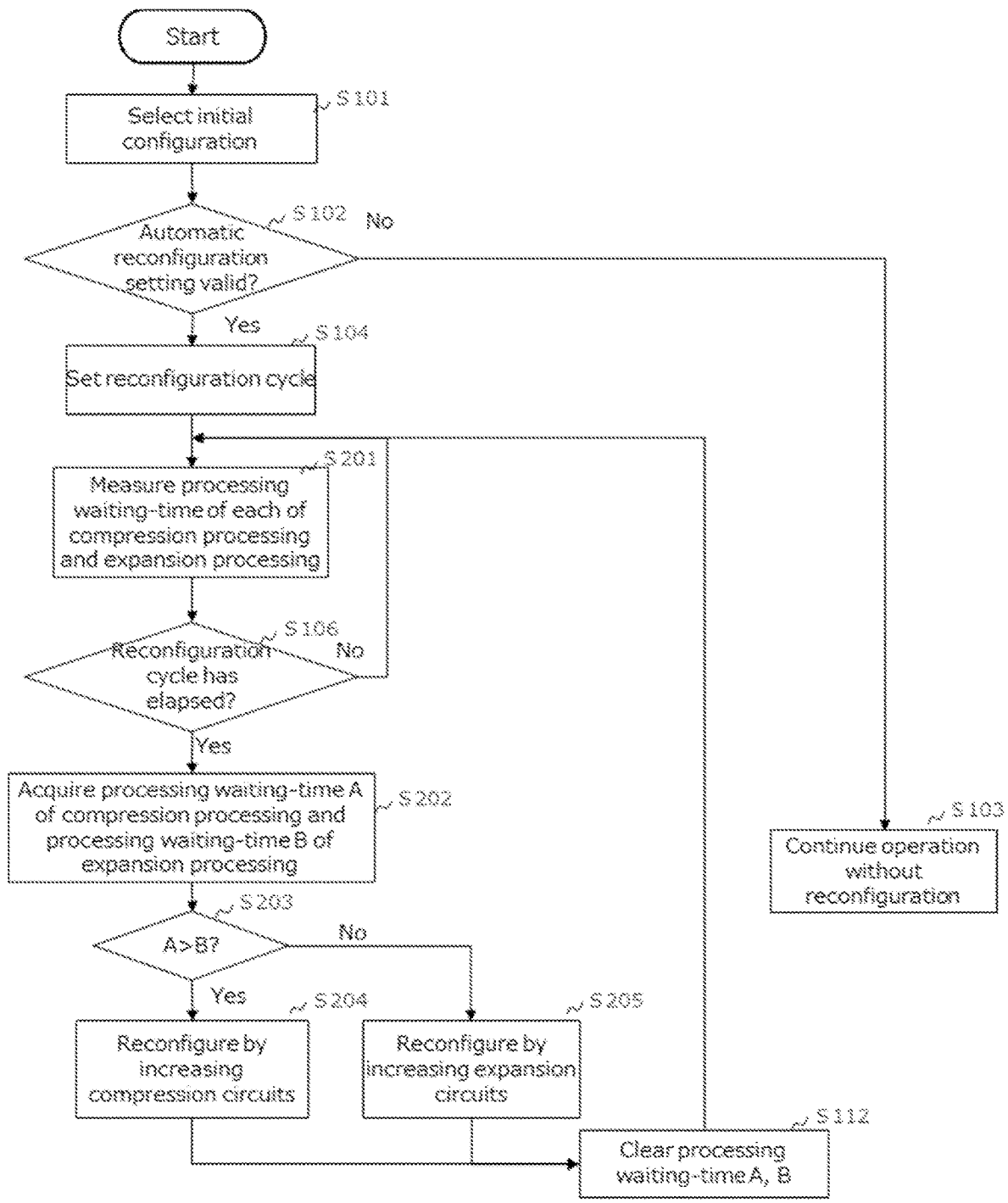
FIG. 10 is a flowchart of the reconfiguration processing according to a second embodiment.

FIG. 10 is a flowchart of the reconfiguration processing according to the second embodiment.

Processing at Steps S101 to S104, S106, S112 are the same as those in the first embodiment shown in FIG. 3.

In the second embodiment, after Step S104, the storage controller 11 measures the processing waiting-time of each of the compression processing and the expansion processing at Step S201. Then, when the reconfiguration cycle has elapsed at Step S106, the storage controller 11 acquires information of processing waiting-time A of the compression processing and processing waiting-time B of the expansion processing at Step S202 and determines whether A is B or more at Step S203.

If A is B or more, at Step S204, the storage controller 11 executes the reconfiguration so as to increase the compression circuits 43 and to decrease the expansion circuits 44. If A is B or less, at Step S205, the storage controller 11 executes the reconfiguration so as to increase the expansion circuits 44 and to decrease the compression circuits 43. The number of circuits to be increased or decreased may be set in advance as a granularity value.

The embodiments of the present invention described above are exemplification for explanation of the present invention and are not intended to limit a scope of the present invention only to those embodiments. Those skilled in the art can work the present invention in the other various modes without departing from the scope of the present invention. And each of the embodiments described above includes the matters indicated below. However, the matters included in each of the embodiments are not limited only to those indicated below.

Matter 1

The compression-expansion control apparatus which performs compression of data in plain text and expansion of the compressed data has a reconfiguration portion which can configure one or more compression circuits which compress the data in plain text and/or one or more expansion circuits which expand the compressed data, a waiting-time observing portion which observes processing waiting-time from when compression processing was requested till when the compression processing is started and processing waiting-time from when expansion processing was requested till when the expansion processing is started, a calculating portion which determines the numbers or a ratio of the compression circuits and the expansion circuits in the reconfiguration portion on the basis of the processing waiting-time of the compression processing and the processing waiting-time of the expansion processing, and a switching portion which executes the reconfiguration of the compression circuit and/or the expansion circuit in the reconfiguration portion on the basis of the numbers or the ratio determined by the calculating portion.

According to the above, since the numbers of the compression circuits and the expansion circuits are controlled on the basis of the processing waiting-time of the compression processing and the processing waiting-time of the expansion processing, favorable performances according to the requested processing of compression and expansion can be exerted.

Matter 2

In the compression-expansion control apparatus described in the matter 1, the calculating portion compares the processing waiting-time of the compression processing with the processing waiting-time of the expansion processing, and if the processing waiting-time of the compression processing is the processing waiting-time of the expansion processing or more, the calculating portion decreases the expansion circuits and increases the compression circuits, and if the processing waiting-time of the expansion processing is the processing waiting-time of the compression processing or more, the calculating portion decreases the compression circuits and increases the expansion circuits.

According to the above, the total waiting time of the compression processing and the expansion processing can be reduced.

Matter 3

In the compression-expansion control apparatus described in the matter 1, the calculating portion compares an index value obtained by dividing the processing waiting-time of the compression processing by the data amount compressed by the compression processing with the index value obtained by dividing the processing waiting-time of the expansion processing by the data amount expanded by the expansion processing and determines the numbers or the ratio of the compression circuits and the expansion circuits on the basis of a comparison result.

According to the above, the waiting time per unit data amount of the total of the compression processing and the expansion processing can be reduced.

Matter 4

In the compression-expansion control apparatus described in the matter 3, supposing that the index value of the compression processing is Twc, the index value of the expansion processing is Twd, time required for processing of data of a predetermined unit data amount per compression circuit is Tc, and time required for processing of data of the unit data amount per expansion circuit is Td, in the case of Twc>0 and Twd>0 and Twc>Twd, the numbers or the ratio is determined so that the compression circuits are increased by the number according to (((Twc−Twd)/2)/Tc), and in the case of Twc>0 and Twd>0 and Twc<Twd, the numbers or the ratio is determined so that the expansion circuits are increased by the number according to (((Twd−Twc)/2)/Td).

According to the above, since the numbers or the ratio is determined so that the waiting time of the compression processing and the waiting time of the expansion processing are balanced, the waiting time of the compression circuit and the expansion circuit can be levelled in a short time.

Matter 5

In the compression-expansion control apparatus described in the matter 4, the calculating portion limits the number to decrease the compression circuits or the expansion circuits in one session of the reconfiguration to a predetermined upper-limit number or less, and the numbers or the ratio of the compression circuits and the expansion circuits is determined such that, if a decrease number of the compression circuits or the expansion circuits determined on the basis of the comparison result is equal to or smaller than the upper-limit number, a decrease by the decrease number is applied, and if the decrease number is the upper-limit number or more, the decrease by the upper-limit number is applied.

According to the above, large lowering of performances of the circuit on a side of number-decrease in one session of the reconfiguration is suppressed, and a well-balanced ratio can be gradually reached.

Matter 6

In the compression-expansion control apparatus described in the matter 1, the reconfiguration portion can cause expansion circuits with a plurality of types of compression algorithms to be mixed, and the waiting-time observing portion observes the waiting time of the expansion processing for each of the plurality of types of the compression algorithms, and the calculating portion determines the number or the ratio of the expansion circuits for each of the compression algorithms on the basis of the waiting time of the expansion circuit for each of the compression algorithms.

Matter 7

In the compression-expansion control apparatus described in the matter 1, in the reconfiguration portion, when the input plain-text data is to be compressed, with the compression circuit and the expansion circuit as a pair, the compression circuit portion generates compressed data in which the input plain-text data is compressed, the expansion circuit generates restored plain-text data in which the compressed data is expanded, and when an error detection code with respect to the input plain-text data and an error detection code with respect to the restored plain-text data match each other, the compressed data and the error detection code with respect to the input plain-text data or the error detection code with respect to the restored plain-text data are output, while when the input compressed data is to be expanded, the expansion circuit singularly generates expanded data in which the input compressed data is expanded, and when an error detection code accompanying the input compressed data and an error detection code with respect to the expanded data match each other, the expanded data is output, and when the compression circuits are decreased, and the expansion circuits are increased, the switching portion replaces the compression circuit included in the pair with the expansion circuit and causes the expansion circuit included in the pair to be the single expansion circuit.

According to the above, in the compression-expansion circuit configured to secure that the processing is normally executed by using the compression circuit and the expansion circuit in the compression processing, an increase and a decrease of the compression circuits and the expansion circuits according to requests can be realized.

What is claimed is:

1. A compression-expansion control apparatus which compresses data in plain text and expands compressed data, the compression-expansion control apparatus comprising:
   a reconfiguration portion configuring one or more compression circuits configured to compress the data in plain text and one or more expansion circuits configured to expand the compressed data on a programmable logical circuit component;

a waiting-time observing portion configured to observe processing waiting-time from when compression processing was requested till when the compression processing is started and processing waiting-time from when expansion processing was requested till when the expansion processing is started;

a calculating portion configured to determine, a number of the compression circuits and the expansion circuits or a ratio of the compression circuits and the expansion circuits, in the reconfiguration portion on a basis of the processing waiting-time of the compression processing and the processing waiting-time of the expansion processing; and a switching portion configured to execute reconfiguration of the compression circuit and the expansion circuit in the reconfiguration portion on the basis of the number or the ratio determined by the calculating portion.

2. The compression-expansion control apparatus according to claim 1, wherein the calculating portion compares the processing waiting-time of the compression processing with the processing waiting-time of the expansion processing, and if the processing waiting-time of the compression processing is equal or more than the processing waiting-time of the expansion processing, the calculating portion decreases the expansion circuits and increases the compression circuits, and if the processing waiting-time of the expansion processing is more than the processing waiting-time of the compression processing, the calculating portion decreases the compression circuits and increases the expansion circuits.

3. The compression-expansion control apparatus according to claim 1, wherein the calculating portion compares an index value obtained by dividing the processing waiting-time of the compression processing by a data amount compressed by the compression processing with the index value obtained by dividing the processing waiting-time of the expansion processing by a data amount expanded by the expansion processing and determines the number of the compression circuits and the expansion circuits or the ratio of the compression circuits and the expansion circuits on a basis of a comparison result.

4. The compression-expansion control apparatus according to claim 3, wherein considering that the index value of the compression processing is Twc, the index value of the expansion processing is Twd, time required for processing of data of a predetermined unit data amount per compression circuit is Tc, and time required for processing of data of the unit data amount per expansion circuit is Td;

in a case of Twc>0 and Twd >0 and Twc>Twd, the numbers or the ratio is determined so that the compression circuits are increased by the number according to (((Twc−Twd)/2)/Tc); and in the case of Twc>0 and Twd >0 and Twc<Twd, the numbers or the ratio is determined so that the expansion circuits are increased by the number according to (((Twd−Twc)/2)/Td).

5. The compression-expansion control apparatus according to claim 4, wherein the calculating portion limits an amount to decrease the compression circuits or the expansion circuits in one session of the reconfiguration portion to a predetermined upper-limit number or less, and the number of the compression circuits and the expansion circuits or the ratio of the compression circuits and the expansion circuits is determined such that, if a decrease number of the compression circuits or the expansion circuits determined on the basis of the comparison result is equal to or smaller than the upper-limit number, a decrease by the decrease number is applied, and if the decrease number is the upper-limit number or more, the decrease by the upper-limit number is applied.

6. The compression-expansion control apparatus according to claim 1, wherein the reconfiguration portion causes expansion circuits with a plurality of types of compression algorithms to be mixed;

the waiting-time observing portion observes waiting time of the expansion processing for each of the plurality of types of the compression algorithms; and the calculating portion determines the number or the ratio of the expansion circuits for each of the compression algorithms on the basis of the waiting time of the expansion circuit for each of the compression algorithms.

7. The compression-expansion control apparatus according to claim 1, wherein in the reconfiguration portion, when input plain-text data is compressed, with the compression circuit and the expansion circuit as a pair, the compression circuit generates compressed data in which the input plain-text data is compressed, the expansion circuit generates restored plain-text data in which the compressed data is expanded, and when an error detection code with respect to the input plain-text data and an error detection code with respect to the restored plain-text data match each other, the compressed data and the error detection code with respect to the input plain-text data or the error detection code with respect to the restored plain-text data are output, while when the input compressed data is expanded, the expansion circuit singularly generates expanded data in which the input compressed data is expanded, and when an error detection code accompanying the input compressed data and an error detection code with respect to the expanded data match each other, the expansion data is output; and when the compression circuits are decreased, and the expansion circuits are increased, the switching portion replaces the compression circuit included in the pair with the expansion circuit and causes the expansion circuit included in the pair to be a single expansion circuit.

8. A storage system comprising:

the compression-expansion control apparatus according to claim 1; and a data storage apparatus, wherein when a request of writing data is received, the compression-expansion control apparatus compresses the data and stores the data in the data storage apparatus, and when a request of reading data is received, the compression-expansion control apparatus reads the data compressed and stored in the data storage apparatus corresponding to the data and expands and outputs the data.

9. A compression-expansion control method for controlling a compression-expansion control apparatus including a reconfiguration portion configuring one or more compression circuits configured to compress data in plain text and one or more expansion circuits configured to expand compressed data on a programmable logical circuit component, the compression-expansion control method comprising:

observing processing waiting-time from when compression processing was requested till when the compression processing is started and processing waiting-time from when expansion processing was requested till when the expansion processing is started;
determining, a number of the compression circuits and the expansion circuits or a ratio of the compression circuits and the expansion circuits, in the reconfiguration portion on a basis of the processing waiting-time of the compression processing and the processing waiting-time of the expansion processing; and
executing reconfiguration of the compression circuit and the expansion circuit in the reconfiguration portion on the basis of the determined number or the ratio.

\* \* \* \* \*